United States Patent [19]
Gealt

[11] 3,854,731
[45] Dec. 17, 1974

[54] FLUID TIGHT SEAL AND METHOD OF MAKING SAME

[75] Inventor: Arthur E. Gealt, Philadelphia, Pa.

[73] Assignee: Honeywell Inc., Minneapolis, Minn.

[22] Filed: Feb. 5, 1973

[21] Appl. No.: 329,444

[52] U.S. Cl. .................................. 277/26, 277/233
[51] Int. Cl. .............................................. F16j 15/10
[58] Field of Search ............ 277/26, 207, 203, 231, 277/233, 192

[56] References Cited
UNITED STATES PATENTS

| 1,569,182 | 1/1926 | Headson | 277/233 |
| 3,025,087 | 3/1962 | Snow | 277/26 |
| 3,249,685 | 5/1966 | Heflin | 277/207 |
| 3,472,254 | 10/1969 | Reed et al. | 277/26 |
| 3,627,337 | 12/1971 | Pippert | 277/233 |
| 3,647,229 | 3/1972 | Grimes | 277/207 |

*Primary Examiner*—Harry N. Haroian
*Assistant Examiner*—Robert I. Smith
*Attorney, Agent, or Firm*—Arthur H. Swanson; Lockwood D. Burton

[57] ABSTRACT

A resilient corrosion resistant multi-layered sealing ring member has a wrinkled outer peripheral sealing surface. The method for forming this ring comprises wrapping several layers of a readily deformable plastic tape on a mandrel and compressing the wrapped layers to substantially reduce their axial dimension.

2 Claims, 3 Drawing Figures

PATENTED DEC 17 1974

3,854,731

FLUID TIGHT SEAL AND METHOD OF MAKING SAME

BACKGROUND OF THE INVENTION

1. Field of the Invention

Applicant's invention is for an improved seal for fluid tight joints and a method of making the same, of the type generally classified in the United States Patent Office with pipe joints or couplings or similar apparatus. The improved apparatus or seal is particularly useful for providing a corrosion resistant fluid tight joint between tubular members having different coefficients of thermal expansion and which are exposed to ambient temperature changes in a corrosive environment.

2. Description of the Prior Art

O-ring seals made of tetrafluorethylene have been employed to provide corrosion resistant fluid tight joints between members having different coefficients of thermal expansion. Such seals however have not provided satisfactory fluid tight sealing joints because of their inherently stiff and smooth peripheral surfaces. O-rings which are made of more deformable materials such as natural rubber or synthetic rubber, and which provide better sealing surfaces have been unsatisfactory because of their inability to resist the corrosive effects of the environment. Corrosion resistant Epoxy bonding materials have also been employed but are unsatisfactory because of their inability to withstand, without cracking and leaking, the ambient temperature changes to which the fluid tight joint is exposed.

SUMMARY OF THE INVENTION

In accordance with the present invention, there is provided a resilient corrosion resistant, multi-layered sealing ring having a wrinkled sealing surface and a method for forming this member. The method comprises the steps of first wrapping several layers of a readily deformable thin plastic tape on a mandrel, and second, axially compressing the layers of tape to the desired axial dimension of the sealing member. Apparatus suitable for effecting such compression comprises a pair of sliding dies mounted on the mandrel and on opposite sides of the tape. The dies are each provided with an annular groove which faces and is adapted to engage an individually associated edge of the tape. When brought together the dies compress the tape to form a compacted laminated sealing ring member having a wrinkled outer peripheral surface.

BRIEF DESCRIPTION OF THE DRAWING

A better understanding of the present invention may be had when the following detailed description is read in connection with the accompanying drawing in which.

DESCRIPTION OF THE PREFERRED EMBODIMENT

Figure 1:
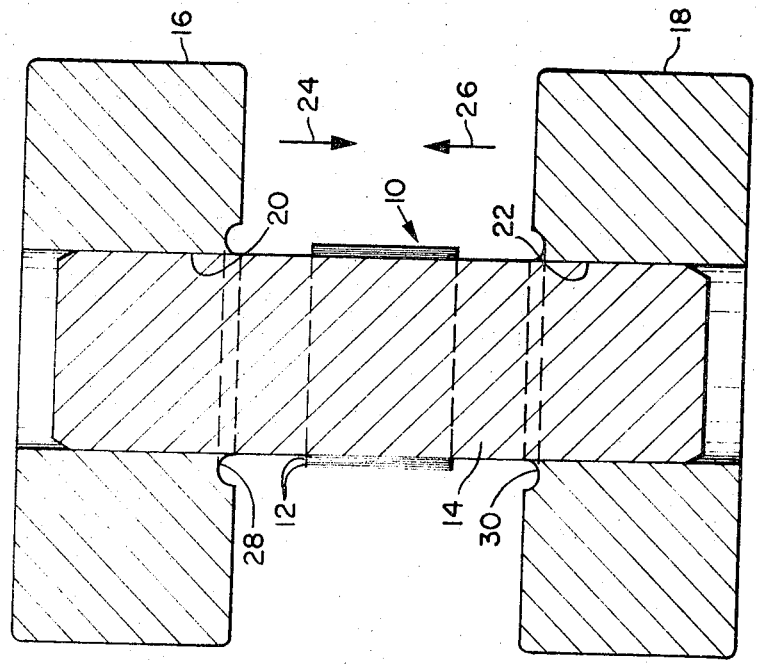
FIG. 1 shows a tape in the form of a ring wrapped about a mandrel and how two sliding dies mounted on the mandrel can be employed to compress the edges of this tape into a sealing ring.

As illustrated in FIG. 1, the first step used in making the sealing ring of this invention, a ring designated 10, is to wrap several layers of a thin plastic tape 12 comprised of a readily deformable corrosion resistant material in a spiral fashion on a cylindrically shaped mandrel 14.

Figure 2:
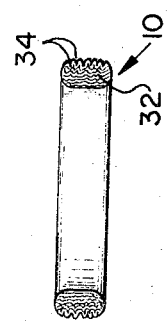
FIG. 2 shows the sealing ring that is formed by bringing the dies together in the direction of the arrows shown in FIG. 1

The second step in producing the sealing ring 10, as indicated in FIG. 1, is to move a pair of dies 16 and 18, toward each other in the axial direction indicated by the arrows 24, 26. The dies have bored out center walls 20 and 22 which are mounted in sliding fit contact with the opposite end portions of the mandrel 14. As the dies 16 and 18 are brought together in this manner, their associated annular grooved outside surfaces 28 and 30 will be forced into contact with the opposite side edges of the wound layers of the tape 12. This operation results in compression of the tape 12 to the shape as shown in FIG. 2. The sliding dies 16 and 18 and the seal 10 so formed are then removed from the mandrel 14.

The tape 12 is preferably made of tetrafluorethylene. Other equivalent materials possessing similar sealing characteristics as tetrafluorethylene may be employed.

It should be readily understood that the length and width of the tape 12 required to produce a suitable seal according to this invention will vary with the size of the fluid joint to be sealed. The annular gap to be filled by the sealing ring 10 in a fluid joint is a function of the difference in diameters of the parts that form this joint. By way of an example, it has been found that a tape 12 that is one half inch wide, 0.003 inches thick and 22 inches long that is spirally wound six turns on itself about the mandrel 14 will result, when compressed as described, in an ideal ring seal 10 whose inside diameter will be 0.687 inches and whose thickness will be 0.103 inches plus or minus 0.020 inches.

As each layer of the tape is wrapped on the mandrel 14 it will remain in its wrapped position due to the inherent electrostatic charge that is created between these layers during the wrapping operation. Thus no means is required to retain the tape on the mandrel in its wrapped condition.

FIG. 2 shows the general configuration of the sealing ring 10. While not shown in FIG. 2, the inner annular surface portion of the sealing ring 10 has a laminar construction, and is formed of a plurality of overlapping compressed layers of the tape. The previously mentioned remaining outer annular layers of the sealing ring 10, as may be seen in FIG. 2, comprises a resilient wrinkled sealing surface 34.

Figure 3:
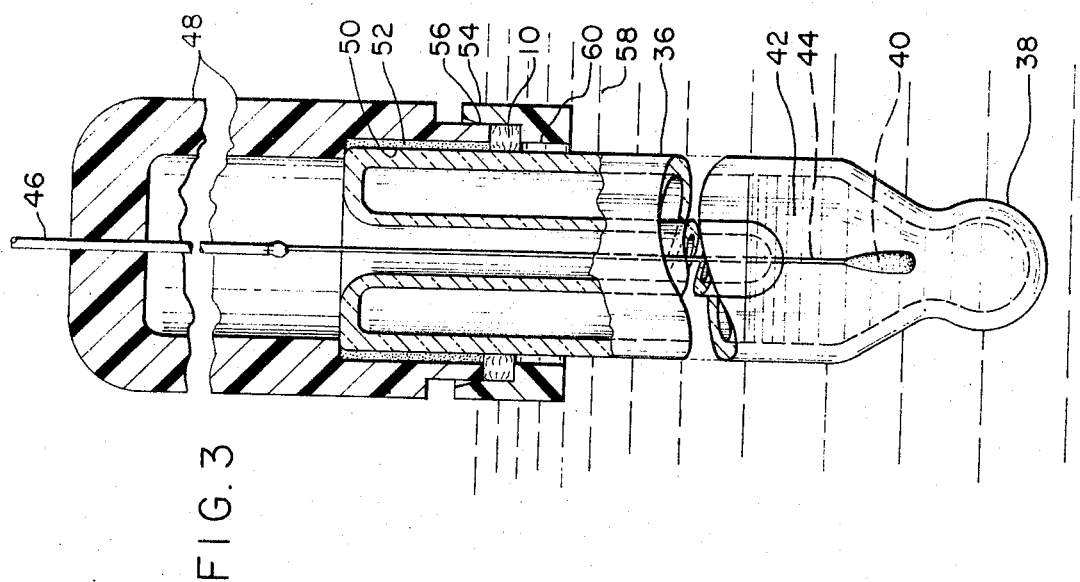
FIG. 3 shows how the sealing ring of FIG. 2 is employed between a glass tube and a plastic cap that surrounds an open end of the tube containing, by way of an example, a small pH sensor.

FIG. 3 shows a conventional pH measuring cell which is comprised of a cylindrical glass tube 36 having a bulbous ion sensitive end 38. A fused salt containing a potassium chloride and sodium chloride electrode 40 is mounted within the tube 36 which also contains an ion exchange liquid or electrolyte 42. An electrical wire connection 44 extends in an upward direction in the tube 36 from the electrode 40. An extension wire 46 connects the electrical wire 44 to a small pH indicating or recording device, not shown.

A cap 48 which is preferably made of a plastic material e.g. glass filled polysulfone, is mounted on and covers the upper cylindrical end portion 50 of the tube 36.

A space is formed by the inner wall of the cap 48 and the outer wall portion 50 of the tube 36 into which a cement like material such as a flexible Epoxy 52 is poured and hardened. This Epoxy retains the tube 48 and the wall portion 50 in a desired spaced-apart aligned relationship with one another so that the fluid tight sealing ring 10 can readily be mounted in the position shown in FIG. 3. Reliance is not placed on the Epoxy for the desired sealing action.

A plastic clamping ring 54 which is of a J-shaped cross section and which is preferably made of a hard plastic material e.g. glass filled polysulfone, is shown surrounding and in surface to surface contact at 56 with the lower end of the cap 48. This surface to surface contact is accomplished in a conventional way, such as by wetting the surfaces with a solvent so that these surfaces may be brought into contact with one another and left to dry. When dried these parts will be retained in fused contact with one another.

While the upper portion of the clamping ring 54 is being pressed upwardly into fixed engagement at 56 with the other cylindrical portion of the cap 48, the sealing ring 10 will be forced into the position shown in FIG. 3. In the FIG. 3 position, the sealing ring 10 will form a resilient corrosion resistant multi-layered fluid tight seal between the outer wall surface of the glass tubing 36, the inner wall of the clamping ring 54 and the lower end of the cap 48. The sealing ring 10 will thus be positioned to prevent a liquid 58, the pH of which is to be measured and which surrounds the glass tube 36, from entering the tube 36 and contaminating the electrolyte 42.

The shape of the outer wall of the mandrel 14 which is employed is not limited to the cylindrical shape as shown in FIG. 1 but can be made of a square, rectangular or any one of many other desired shapes. The shape that is selected for the mandrel will depend on the shape of the respective outer and inner wall parts between which the sealing ring 10 is required to form a resilient corrosive resistant fluid tight joint.

The aforementioned described sealing ring will provide a fluid tight joint because:

1. This resilient sealing ring 10 when compressed in the aforementioned manner by the clamping ring 54 will be more effective than prior known seals to seal any crevices that may be present in the cap 48, in the clamping ring 54 or in the outer peripheral portion of the glass tubing 36;

2. This sealing ring 10 is impervious to strong acids, strong alkaline and other chemical constituents normally found in the measured process liquid 58. This liquid 58 might, for example be the chemical, ammonium nitrate, that is being produced in a chemical process;

3. The resilient, thin, multi-layered wrinkled construction of the sealing ring 10 enables it to provide a fluid tight seal even when the glass tube 36, cap 48 and the clamping ring 54, which forms the area in which the sealing ring 10 is confined, have different temperature coefficients of expansion and are exposed to widely varying temperature changes taking place in their environment.

The embodiments of the invention in which an exclusive property or privilege is claimed are defined as follows:

1. A fluid tight sealing means to seal an opening formed between the outer wall of a cylindrical member that has a low coefficient of thermal expansion and an adjacent annular member that surrounds said cylindrical member that has a substantially higher coefficient of thermal expansion while wide degrees of temperature changes occur in the environment surrounding the sealing means, said sealing means being a ring constructed of a resilient plastic material that has an inner fluid tight sealing wall surface and axial sidewall surfaces which together provide a U-shaped configuration, said inner sealing wall being dimensioned to resiliently engage the outer wall of the cylindrical member, and a wrinkled outer wall surface that is dimensioned to resiliently engage the inner surface of said annular member.

2. The sealing means of claim 1 further characterized in that the ring is of a resilient laminated construction formed of overlapping layers.

* * * * *